May 26, 1942.                J. W. FRENCH                    2,284,567
                         LENS FOR OPTICAL PURPOSES
                             Filed June 9, 1941
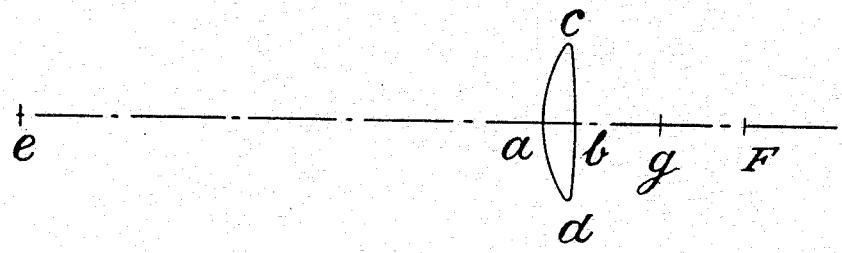
Inventor.
James Weir French.
per. E. H. Bird
                Attorney.

Patented May 26, 1942

2,284,567

UNITED STATES PATENT OFFICE 2,284,567

LENS FOR OPTICAL PURPOSES

James Weir French, Anniesland, Glasgow, Scotland, assignor to Barr and Stroud, Limited, Anniesland, Glasgow, Scotland Application June 9, 1941, Serial No. 397,342
In Great Britain September 8, 1939

4 Claims. (Cl. 88—57)

This invention refers to lenses for optical purposes and it is concerned with a lens form capable of general application, but particularly applicable to collimator lenses, for example, for use in illuminated gun sights, other applications being to photographic camera lenses and eyepieces of telescope instruments, the principal object of the invention being to produce a single double-convex lens of the type having one surface of paraboloidal form and the other of spherical form in which the ratio of focal length to aperture can be reduced to a degree such as, it is believed, has only been obtained by means of complex lens combinations.

According to the present invention, a lens is provided of double-convex character, having one surface of paraboloidal or approximately paraboloidal form, and the other surface of spherical form, with the radius of curvature of the spherical surface not less than three times or more than six times the vertex radius of curvature of the paraboloidal surface.

In use the lens is placed with the paraboloidal surface adjacent to the long conjugate distance (or to the parallel light) and the spherical surface adjacent to the short conjugate distance.

The material of the lens should have a refractive index greater than 1.5 and less than 1.55.

In this way, a single lens can be produced having a clear aperture at least equal to half its focal length.

An example of a lens according to the invention is shown in the accompanying drawing. Particulars of the lens are as follows:

Refractive index_____ 1.523
Radii of curvature:
    Paraboloid at vertex (g a)___ .920 (convex)
    Spherical (e b)_____ 4.410 (convex)
Thickness (b a)_____ .270
Aperture (c d)_____ 1.025
Focal length (F being the focal
  point on the spherical side)__ 1.481
Back focus (b F)_____ 1.332

I claim:

1. A lens of double convex character for optical purposes, having one surface of paraboloidal or approximately paraboloidal form and the other surface of spherical form, with the radius of curvature of the spherical surface not less than three times or more than six times the vertex radius of curvature of the paraboloidal surface, and the material of the lens having a refractive index greater than 1.5 and less than 1.55.

2. A lens of double convex character, for optical purposes, having one surface of paraboloidal or approximately paraboloidal form and the other surface of spherical form, with the radius of curvature of the spherical surface not less than three times or more than six times the vertex radius of curvature of the paraboloidal surface, the lens having a clear aperture at least equal to half its focal length, and the material of the lens having a refractive index greater than 1.5 and less than 1.55.

3. An optical system comprising a lens of double convex character having one surface of paraboloidal or approximately paraboloidal form and the other surface of spherical form, with the radius of curvature of the spherical surface not less than three times or more than six times the vertex radius of curvature of the paraboloidal surface, the lens being placed with the paraboloidal surface adjacent to the long conjugate distance (or to the parallel light) and the spherical surface adjacent to the short conjugate distance.

4. An optical system comprising a lens of double-convex character having one surface of paraboloidal or approximately paraboloidal form and the other surface of spherical form, with the radius of curvature of the spherical surface not less than three times or more than six times the vertex radius of curvature of the paraboloidal surface, and the material of the lens having a refractive index greater than 1.5 and less than 1.55, the lens being placed with the paraboloidal surface adjacent to the long conjugate distance (or to the parallel light) and the spherical surface adjacent to the short conjugate distance.

JAMES WEIR FRENCH.